United States Patent
Rhodes (10) Patent No.: US 12,208,514 B2
(45) Date of Patent: *Jan. 28, 2025

(54) INDUCTIVE COUPLING ACROSS A MOVING BOUNDARY OF A MOBILE DEVICE

(71) Applicant: Sphero, Inc., Boulder, CO (US)

(72) Inventor: Richard Rhodes, Broomfield, CO (US)

(73) Assignee: Sphero, Inc., Greenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,479

(22) Filed: Mar. 27, 2023

(65) Prior Publication Data

US 2023/0226704 A1 Jul. 20, 2023

Related U.S. Application Data (63) Continuation of application No. 16/883,112, filed on May 26, 2020, now Pat. No. 11,613,029, which is a continuation of application No. 15/397,221, filed on Jan. 3, 2017, now Pat. No. 10,661,432.

(51) Int. Cl.
*B25J 19/00* (2006.01)
*B25J 5/00* (2006.01)
*B60L 1/00* (2006.01)
*B60L 50/60* (2019.01)

(52) U.S. Cl.
CPC ............. *B25J 19/0045* (2013.01); *B25J 5/00* (2013.01); *B60L 1/00* (2013.01); *B60L 50/60* (2019.02); *Y02T 10/70* (2013.01); *Y10S 901/01* (2013.01)

(58) Field of Classification Search
CPC ..... B60L 1/00; B60L 50/60; B25J 5/00; B25J 19/0045; Y02T 10/70; Y10S 901/01
See application file for complete search history.

(56) References Cited

U.S. PATENT DOCUMENTS

| 10,661,432 B2 | 5/2020 | Rhodes |
| 11,613,029 B2 * | 3/2023 | Rhodes ................ B25J 19/0045 |
| | | 191/10 |
| 2012/0173047 A1 | 7/2012 | Bernstein et al. |
| 2014/0054973 A1 | 2/2014 | Asanuma et al. |
| 2014/0062996 A1 | 3/2014 | Kopychev et al. |
| 2015/0224941 A1 | 8/2015 | Bernstein et al. |
| 2016/0291595 A1 | 10/2016 | Halloran et al. |
| 2016/0329747 A1 | 11/2016 | Lenius et al. |
| 2016/0349748 A1 | 12/2016 | Bernstein et al. |

OTHER PUBLICATIONS

International Preliminary Report on Patentability received for PCT Patent Application No. PCT/US2018/012063, mailed on Jul. 18, 2019, 11 pages.
International Search Report and Written Opinion received for PCT Patent Application No. PCT/US2018/012063, mailed on May 9, 2018, 18 pages.

* cited by examiner

*Primary Examiner* — Robert J McCarry, Jr.
(74) *Attorney, Agent, or Firm* — Faegre Drinker Biddle & Reath LLP (57) ABSTRACT

A method of inductively coupling a first body and a second body is provided, wherein the first body rotates relative to the second body. During rotation, alignment is maintained between a first and second coil. Signals are sent and received between the coils.

20 Claims, 6 Drawing Sheets

INDUCTIVE COUPLING ACROSS A MOVING BOUNDARY OF A MOBILE DEVICE

CROSS-REFERENCE TO RELATED APPLICATIONS

This application is a continuation of U.S. patent application Ser. No. 15/397,221, filed Jan. 3, 2017, which application is incorporated herein by reference in its entirety.

INTRODUCTION

Robotic devices may be autonomous, semi-autonomous, or user-controlled, and often include a frame or housing. Robotic devices may include external wheels or tracks, or may include internal motors and actuators that drive the robot by applying a force from the frame or housing to a ground surface, thus moving the robot. Accessories used in conjunction with the robotic devices may require physical fastening elements to connect the accessories to portions of a frame or housing.

SUMMARY

In one aspect, the technology relates to a method of inductively coupling a first body and a second body, wherein the first body is rotatable relative to the second body, the method includes: rotating the first body relative to the second body; and while rotating the first body, maintaining alignment of a first coil disposed in the first body to a second coil disposed in the second body; and at least one of: (a) sending a signal from the first coil to the second coil and (b) receiving a signal from the second coil at the first coil. In an example, the second coil is fixed relative to an outer surface of the second body. In another example, the first coil is movable relative to an outer surface of the first body. In yet another example, the first body has a substantially spherical outer surface. In still another example, the first body is configured to be rotated about an axis substantially parallel to the first coil.

In another aspect, the technology relates to an apparatus includes: a body having a body housing having an outer surface and an inner surface at least partially defining an interior body volume; a drive element rotatably engaged with the inner surface; a biasing mechanism for biasing the drive element into contact with the inner surface, wherein the biasing mechanism includes a bearing disposed opposite the drive element; and a body coil disposed in the interior body volume and about the biasing mechanism. In an example, the apparatus further includes an accessory having: an accessory housing defining an interior accessory volume; an accessory coil disposed in the interior accessory volume; and a retaining element disposed proximate the accessory coil. In another example, at least one of the bearing and the retaining element includes a magnet. In yet another example, the retaining element is configured to magnetically couple with the bearing. In still another example, the retaining element is magnetically coupled with the bearing, a center point of the body coil is aligned with a center point of the accessory coil.

In another example of the above aspect, the accessory coil and the retaining element are fixed relative to the accessory casing. In an example, the accessory coil is disposed about the retaining element.

In another aspect, the technology relates to an apparatus having: a first body having a first body housing, wherein the first body housing is configured to rotate about an axis; a first coil disposed in the first body housing, wherein the first body housing is configured to rotate relative to the first coil; a second body disposed proximate the first body, the second body having a second body housing; a second coil disposed in the second body housing, wherein the second coil is configured to be aligned with the first coil during a rotation of the first body housing. In an example, the first coil is disposed substantially parallel to the axis. In another example, the first body housing is substantially cylindrical. In yet another example, the first body housing is substantially spherical. In still another example, the first coil includes an outer diameter smaller than an outer diameter of the second coil.

In another example of the above aspect, a first magnet disposed in the first body and a second magnet disposed in the second body housing, wherein the first magnet and second magnet magnetically engage to retain the first body in proximity to the second body. In an example, the first coil is disposed about the first magnet. In another example, the first magnet bears against an inner surface of the first body casing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

A self-propelled robotic device is disclosed that includes a housing (that may be spherical, cylindrical, or otherwise curved) and an internal drive system including one or more motors coupled to one or more wheels engaged to an inner surface of the housing. A biasing mechanism, including a spring and a contact end, may be coupled to the internal drive system to provide an opposing force between the wheels and contact end to allow for power to the motors to be transferred to the inner surface of the housing, causing the self-propelled device to roll along a surface. The self-propelled device can rotate based on a combination of movement of its center of mass, independent power to the motors, and the force of the biasing mechanism against the inner surface. A magnetic coupling component may be included with the biasing mechanism. The magnetic coupling component can include ferrous metal or a permanent magnet, such as a neodymium magnet, to provide a magnetic field through the housing to magnetically interact with external devices or accessories.

An external accessory may include a magnetic coupling component to magnetically couple with the magnetic coupling component of the biasing mechanism (e.g., the contact end). Accordingly, when the housing of the self-propelled device is caused to roll, the external accessory can remain stably coupled to the contact end of the biasing mechanism via magnetic interaction through the spherical housing, without the need for mechanical fasteners.

Either the self-propelled device or the external accessory, or both, can include a magnet (e.g., a neodymium magnet) to produce the magnetic field causing the magnetic interaction. Such interaction may involve a magnetic attraction in which contact occurs between the external accessory and the outer surface of the housing. In such examples, friction may be reduced by coating the outer surface of the housing and/or a contact surface of the external accessory with a substantially frictionless material. Additionally or alternatively, the magnetic interaction may involve a repulsive force including stability mechanism (e.g., one or more further magnets) to create stable magnetic levitation between the external accessory and the housing.

Figure 1:
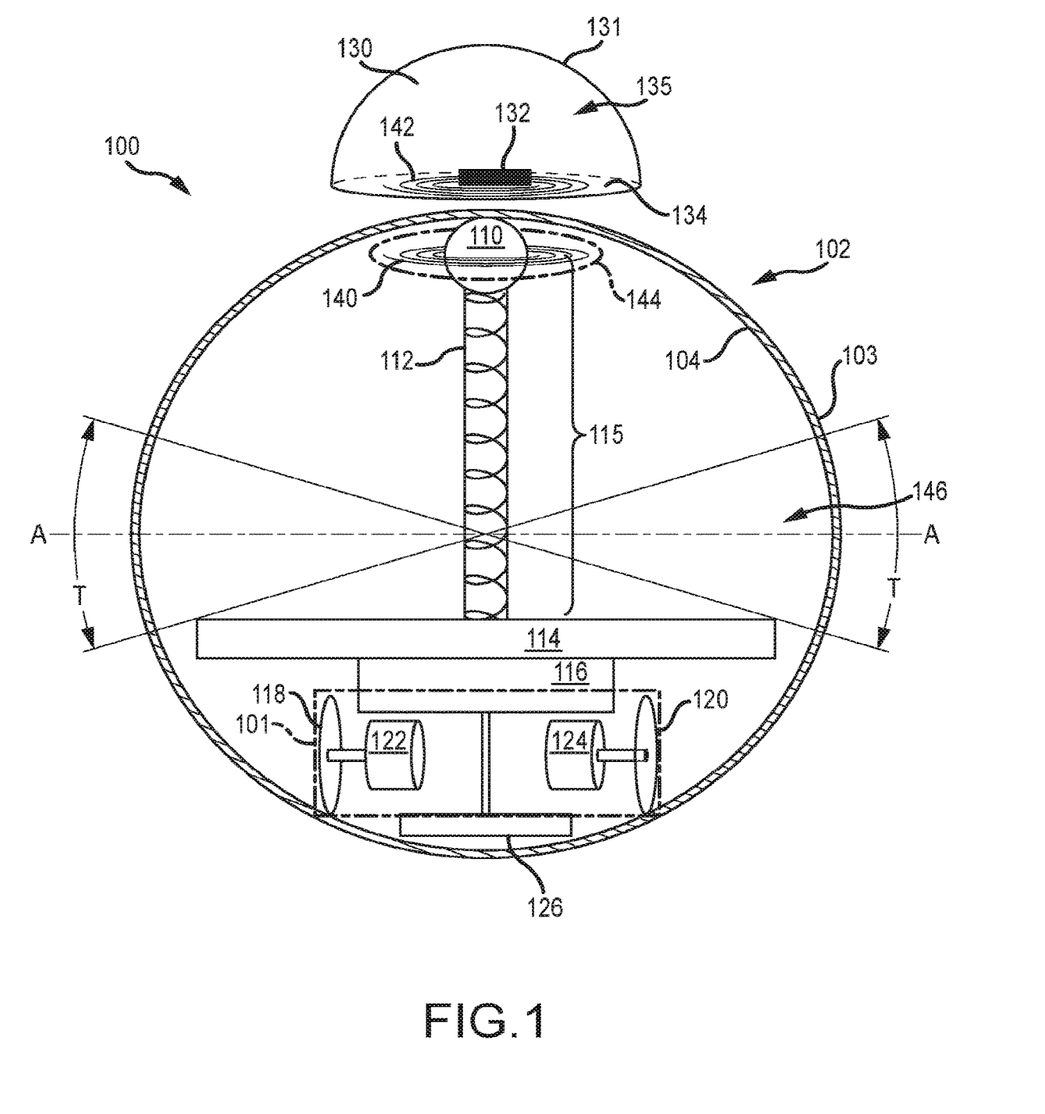
FIG. 1 depicts a perspective view of a first example of a robotic device.

FIG. 1 illustrates an example of a self-propelled body or device 100, and shows a schematic illustrating components of a spherical self-propelled device. However, variations of the present disclosure are not limited to such devices. The self-propelled device 100 can be of a size and weight allowing it to be easily grasped, lifted, and carried. The self-propelled device 100 can include a spherical casing or housing 102 with an outer surface 103 that makes contact with an external surface (e.g. ground, floor) as the device 100 rolls. In addition, the spherical housing 102 includes an inner surface 104. Additionally, the self-propelled device 100 includes several mechanical and electronic components enclosed by the spherical housing 102.

The spherical housing 102 can be made of a material that transmits signals used for wireless communication, yet are impervious to moisture, dirt, and other contaminants. The material may be durable, washable, and/or shatter-resistant. The spherical housing 102 may also be structured to enable transmission of light and can be textured to diffuse light generated by an internal light source (not shown). In one example, the housing is made of sealed polycarbonate plastic. Furthermore, the spherical housing 102 can include one or more surfaces that are textured to diffuse light. In one example, the spherical housing 102 comprises two hemispherical shells with an associated attachment mechanism, such that the spherical housing 102 can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 101 to enable the device 100 to propel itself. The drive system 101 can be coupled to processing resources and other control mechanisms, as described elsewhere herein. The carrier 114 serves as the attachment point and support for components of the drive system 101. The components of the drive system 101 are not rigidly attached to the spherical housing 102. Instead, the drive system 101 can include a pair of drive elements, such as wheels 118, 120 that are in frictional contact with the inner surface 104 of the spherical housing 102.

The carrier 114 is in mechanical and electrical contact with an energy storage 116. The energy storage 116 provides a reservoir of energy to power the device 100 and electronics and can be replenished through an inductive charge port 126. The energy storage 116, in one example, is a rechargeable battery. In one variation, the battery is composed of lithium-polymer cells. In other variations, other rechargeable battery chemistries are used. The carrier 114 can provide the mounting location for most of the internal components, including printed circuit boards for electronic assemblies, sensor arrays, antennas, and connectors, as well as providing a mechanical attachment point for internal components.

The drive system 101 can include motors 122, 124 and wheels 118, 120. The motors 122 and 124 connect to the wheels 118 and 120, respectively, each through an associated shaft, axle, and gear drive (not shown). The perimeter of wheels 118 and 120 are two points where the interior mechanism is in mechanical contact with inner surface 104. The points where wheels 118 and 120 contact inner surface 104 may be coated with a material to increase friction and reduce slippage. For example, the wheels 118 and 120 can be covered with silicone rubber tires.

In some variations, a biasing mechanism 115 is provided to actively force the wheels 118, 120 against the inner surface 104. In an example provided, elements such as a spring 112 and a spring end 110 can comprise the biasing mechanism 115. More specifically, the spring 112 and the spring end 110 are positioned to contact inner surface 104 at a point general opposite to the wheels 118 and 120. More specifically, the spring end 110 acts as bearing for forcing the wheels 118, 120 into the inner surface 104. The spring 112 and the spring end 110 provide additional contact force to reduce slippage of the wheels 118 and 120, particularly in situations where the interior mechanism is not positioned with the wheels at the bottom and where gravity does not provide adequate force to prevent the drive wheels 118, 120 from slipping. The spring 112 is selected to provide a force to press the wheels 118, 120 and the spring end 110 against inner surface 104.

The spring end 110 can be designed to provide near-frictionless contact with the inner surface 104. The spring end 110 can comprise a rounded surface configured to mirror a low-friction contact region at all contact points with the inner surface 104. Additional means of providing near-frictionless contact may be provided. In another implementation, the rounded surface may include one or more bearings to further reduce friction at the contact point where end 110 moves along inner surface 104. The spring 112 and the spring end 110 can be made of a non-magnetic material to avoid interference with magnetic sensors. However, in variations, the spring end 110 can include one or more retaining elements such as magnetic components to magnetically couple to an external accessory 130.

In some examples, the spring 112 has a spring constant such that the wheels 118, 120 and the spring end 110 are almost constantly engaged to the inner surface 104 of the spherical housing 102. As such, much of the power from the motors 122, 124 is transferred directly to rotating the spherical housing 102, as opposed to causing the internal components (i.e., the biasing mechanism 115 and internal drive system 101) to pitch. Thus, while motion of the self-propelled device 100 may be caused, at least partially, by pitching the internal components (and therefore the center of mass), motion may also be directly caused by active force of the wheels 118, 120 against the inner surface 104 of the spherical housing 102 (via the biasing mechanism 115) and direct transfer of electrical power from the motors 122, 124 to the wheels 118, 120. As such, the pitch of the biasing mechanism 115 may be substantially reduced, and remain substantially constant (e.g., substantially perpendicular to the external surface on which the self-propelled device 100 moves). Additionally or as an alternative, the pitch of the biasing mechanism 115 may increase (e.g., to over 45 degrees) during periods of hard acceleration or deceleration. Furthermore, under normal operating conditions, the pitch of the biasing mechanism 115, can remain stable or subtly vary (e.g., within 10-15 degrees).

The force of the wheels 118, 120 against the inner surface 104 of the spherical housing 102 causes rotation of the housing 102, so as to move the device 100 across a surface. When the self-propelled device is moving in a substantially straight line, the motors 122, 124 rotate the wheels 118, 120 such that the housing 102 rotates about a generally horizontal axis A. Under such conditioned, the coils 140, 142 are disposed generally parallel to the axis A. Differential rotation of the wheels 118, 120 causes the housing 102 to change direction of rotation (e.g., to turn to the right or the left), and the internal components to pitch, as described above. During such turning operations, the axis A about which the housing 102 rotates may tilt T to positions depicted by the dashed lines. When the axis A is tilted the coils 118, 120 are not necessary parallel to the tilted axis A. Therefore, in general, the axis A about which the housing 102 rotates does not pass through either of coils 140, 142.

The spring end 110 can be formed of a magnetic metal that can be attracted to a magnet. Such metals can include iron, nickel, cobalt, gadolinium, neodymium, samarium, or metal alloys containing proportions of these metals. Alternatively, the spring end 110 can include a substantially frictionless contact portion, in contact with the inner surface 104 of the spherical housing 102, and a magnetically interactive portion, in contact or non-contact with an inner surface 104, including the above metals or metal alloys. The substantially frictionless contact portion can be comprised of an organic polymer such as a thermoplastic or thermosetting polymer. Alternatively, the spring end 110 can be formed of a magnet, such as a polished neodymium permanent magnet. In such variations, the spring end 110 can produce a magnetic field extending beyond the outer surface of the spherical housing 102 to magnetically couple with an external second body, in this case an accessory device 130. Alternatively still, the spring end 110 can be comprised of a substantially frictionless contact portion, and have a magnet included therein. Alternatively still, the magnetic component of the self-propelled device 100 may be included on any internal component, such as the spring 112 or the carrier 114, or an additional component coupled to the biasing mechanism 115 or the carrier 114.

Additionally or alternatively, the external accessory device 130 can include a retaining element such as a magnetic component 132 to magnetically couple with the biasing mechanism 115 (e.g., the spring end 110). The magnetic component 132 can comprise a permanent magnet, such as a neodymium magnet. In such variations, the magnetic component 132 can magnetically couple to the spring end 110. As such, the magnetic field produced by the magnetic component 132 can extend through the spherical housing 102 to remain in magnetic contact with the spring end 110.

Alternatively, the magnetic component 132 of the external accessory device 130 can comprise a magnetic metal that can be attracted to a magnet comprising the spring end 110. As stated above, such metals can include iron, nickel, cobalt, gadolinium, neodymium, samarium, or metal alloys containing proportions of these metals.

In further examples, one or more of the spring end 110 and the magnetic component can be comprised of any number of electro magnets or permanent magnets. Such magnets may be irregular in shape to provide added magnetic stability upon motion of the self-propelled device 100. For example, the magnetic component 132 of the accessory device 130 can be a single or multiple magnetic strips including one or more tributary strips to couple with a single or multiple correspondingly shaped magnets included on the spring end 110. Furthermore, multiple magnets may be dispersed through the external accessory device 130 and the spring end 110 to provide additional stability.

Alternatively, the spring end 110 and external accessory device 130 can be in a stable magnetically repulsive state as the self-propelled device 100 moves. In such variations, either the magnetic component 132 or the spring end 110 can include a superconductor material to substantially eliminate dynamic instability of a repelling magnetic force in order to allow for stable magnetic levitation of the accessory device in relation to the spring end 110 while the spherical housing 102 rotates therebetween. In similar variations, a diamagnetic material may be included in one or more of the self-propelled device 100, spring end 110, or the external accessory device 130 and can provide stability for magnetic levitation. Thus, without the use of guiderails or a magnetic track, the self-propelled device 100 may be caused to maneuver in any direction with the external accessory device 130 remaining in a substantially constant position along a vertical axis of the self-propelled device (Cartesian or cylindrical z-axis, or spherical r-coordinate with no polar angle ($\theta$)).

The external accessory device 130 can have a casing or housing 131 in the form of any shape and can be comprised of any suitable material. A contact surface 134 of the external accessory device, or a surface closest to the outer surface of the spherical housing 102 (during magnetic interaction), can be formed to substantially correspond to the outer surface 103 of the spherical housing 102. As such, both the spherical housing 102 of the self-propelled device 100 and the external accessory device 130, namely the contact surface 134, can have substantially equivalent radii of curvature. In certain variation, this radius of curvature can be approximately 10-30 cm. However, it is contemplated that other examples of self-propelled devices and accompanying external accessory devices may have a radius on the order of one meter upwards to the size of a human transportation vehicle and beyond. As such, magnetic coupling or interaction may be achieved using powerful electromagnets disposed within the self-propelled device 100 to couple with the external accessory device 130, which may be configured to perform actions, carry payload, include a novel design, represent a character or figure, or the like.

Wireless data and power transfer is enabled between the housing 103 and the accessory device 130 via a plurality of inductive coils 140, 142. The inductive coil 140 is disposed in the housing 102, e.g., about the spring end 110. The inductive coil 140 may be encased within a rigid shell 144 to protect the coil 140. The shell 144 may be secured to the spring end 110 or the spring 112, so as to keep the coil 140 disposed proximate the inner surface 104 of the housing 102. Thus, the shell 144 and coil 140 are free to move within an interior volume 146 of the housing 102, while remaining centered about the spring end 110. This helps maintain alignment with the inductive coil 142 that is fixed about the magnetic component 132 within an interior volume 135 of the accessory 130. The inductive coil 142 disposed within the accessory 130 may also be contained within a protecting shell or casing, but remains generally fixed within the accessory 130. By maintaining alignment between the coils 140, 142, even during movement of the housing 102 relative to the accessory 130, the coils 140, 142 may remain communicatively coupled during movement of the robot 100.

Alignment between the coils 140, 142 may be measured physically (e.g., by confirming alignment of a center of each coil 140, 142) or functionally (e.g., by confirming alignment sufficient to enable transfer of signals between the coils 140, 142). Other components associated with the coils 140, 142 are depicted below.

The contact surface 134 of the external accessory device 130 can be formed or coated with a substantially frictionless material, such as a synthetic compound or suitable polymer. Other suitable compounds include TEFLON® brand polytetrafluoroethylene (PTFE) or DELRIN® brand polyoxymethylene (POM) coatings. However, any substantially frictionless coating is contemplated, including ultra-repellant surfaces or liquid-impregnated surfaces and materials, such as slippery liquid infused porous surface (SLIPS). Further examples of substantially frictionless surfaces or coatings include "ceramic alloys," or "cermets," which may be created by combining a metal alloy with a ceramic compound. For example, a metal/ceramic alloy comprised of boron, aluminum, and magnesium ($AlMgB_{14}$) may be combined with the cermetic compound of titanium diboride ($TiB_2$) to provide a near-frictionless coating for the contact surface 134 of the external accessory device 130.

Additionally or as an alternative, the outer surface of the spherical housing 102 can be comprised of any of the above substantially frictionless coatings or compounds discussed with respect to the contact surface 134 of the external accessory device 130. Accordingly, any combination of substantially frictionless coatings or compounds may be incorporated with respect to the outer surface of the spherical housing 102 and the contact surface of the external accessory device 130.

Furthermore, the spherical housing 102 may be formed to include an inner surface 104 more conducive to providing added friction using, for example, a rubber compound or other suitable synthetic compound, such as a silicone. Additionally, the spherical housing 102 may be formed to include an outer surface having near-frictionless properties using coatings or compounds discuss above.

In the above examples, when the self-propelled device 100 moves, the external accessory device 130 can remain magnetically coupled to the spring end 110 at a substantially constant position on top of the self-propelled device 100. As such, while the self-propelled device 100 is being maneuvered, the biasing mechanism 115 may have a variable tilt angle (polar angle ($\theta$) relative to the plane of motion) that remains somewhat minimal, but in most cases, does not typically exceed 45 degrees, except during periods of relatively extreme acceleration. However, during continuous and stable maneuvering of the self-propelled device 100, the tilt of the biasing mechanism 115 may be closer to zero degrees, or within 10 degrees. Furthermore, during maneuvering, the azimuth ($\varphi$) can vary at any angle depending on independent power transferred from the motors 122, 144 to the wheels 118, 120.

Figure 2:
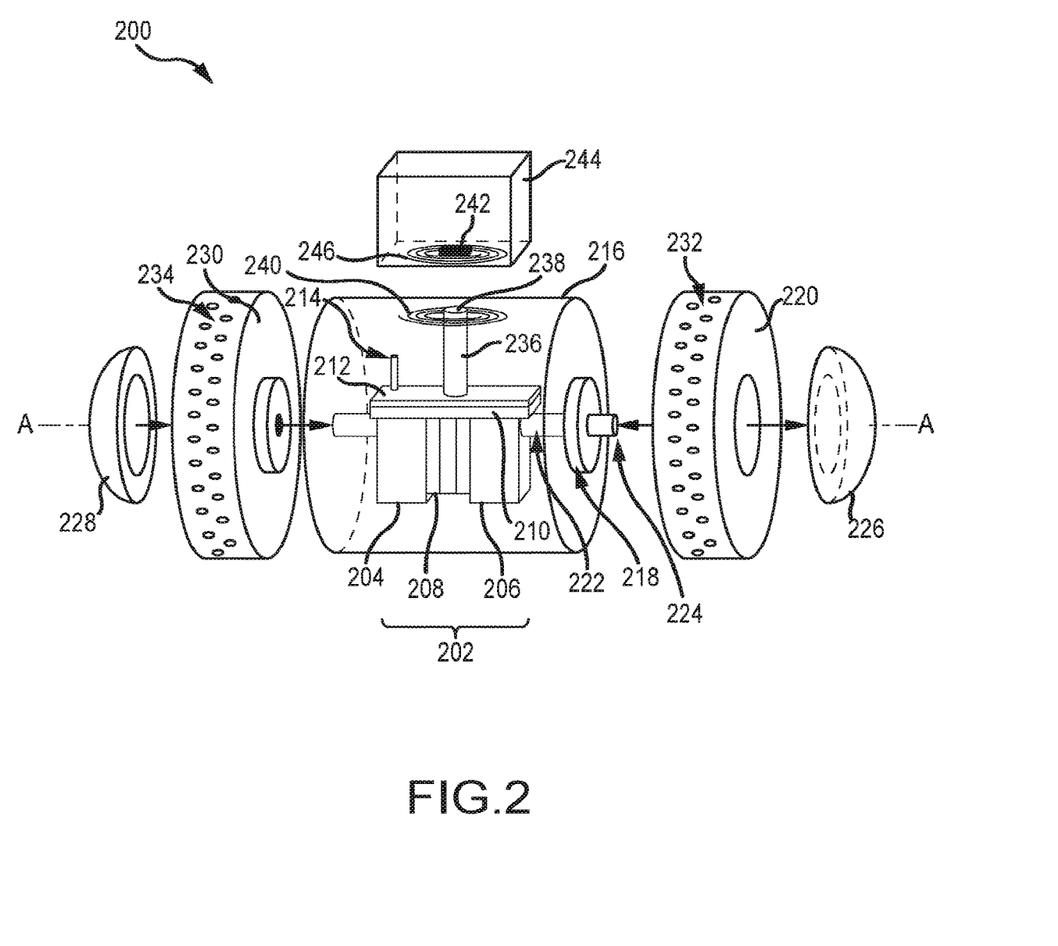
FIG. 2 depicts an exploded perspective view of a second example of a robotic device.

FIG. 2B depicts an exploded perspective view of an example of a cylindrical self-propelled device 200. A drive system 202 includes a first motor 204 and a second motor 206 with respective axles, one or more power units 208, a carrier 210, a circuit board 212 with any number of electronic components, and a receiver 214 which can be configured or included as any variety of wireless communication standards and/or technologies.

The above components are included within a body 216 of the self-propelled device 200. Furthermore, any combination of the above features can be configured to be rigidly fixed to the body 216. For example, the carrier 210 can be mounted or otherwise attached to an inner portion of the body 216. Alternatively, any number of interior components of the self-propelled device 200 can be coupled to the inner portion of the body 216. Accordingly, due to the interior components being rigidly fixed to the body 216, the body 216 can rotate in conjunction with the rotational pitch of the drive system 202 when the self-propelled device 200 is being maneuvered.

The body 216 is substantially cylindrical in shape and can include any number of designs and features. For example, the body 216 can be at least partially transparent such that light from an internal light-emitting component disposed within the body 216 is apparent from outside of the device 200. The internal light-emitting component can be any type of illuminating element, such as one or more light-emitting diodes (LEDs) or one or more LED arrays. The illuminating element can be affixed to the carrier 210, or any other interior component of the self-propelled device 200. As an addition or alternative, the body 216 can be comprised of sealed polycarbonate plastic or other composite that can be textured to diffuse light from the internal illuminating element.

Furthermore, the body 216 may be composed of a material that allows for transmission of signals used for wireless communication. Still further, an outer surface of the body 216 can be comprised of a material that is substantially impervious to moisture and every day wear and tear. The body 216 can be detachable from the self-propelled device 200 to allow for access to the interior components, and may further be durable, washable, and/or shatter resistant.

As an addition or alternative, the body 216 can include fastening or attachment points to allow for removable accessories to be attached to the exterior of the body 216. As discussed in further detail below, these accessories may include, for example, an attachable head lamp or a trailer attachment.

A gear 218 for a particular wheel 220 can be molded or formed at least partially within an interior portion of the wheel 220. Alternatively, the gear 218 can be included as a portion of a power train in which the motor 206 is coupled to an axle 222 and gear 218 combination. Accordingly, the axle 222 and gear 218 combination may then be fitted to the wheel 220. Alternatively, an axle and gear combination can be formed at least partially within an interior portion of a wheel.

Still further, a wheel hub 224 can be (i) formed at least partially within an outer portion of a respective wheel (not shown), (ii) formed in combination with a gear within an inner radius of a wheel (also not shown), or (iii) part of the power train attached to the gear 218 and axle 222. In the latter example, the wheel hub 224 can be a part of or coupled to the axle 222, and can further be configured to protrude from the outer portion of the wheel 220. The self-propelled device 200 can further incorporate removable hub covers 226, 228 that can be readily attached and detached from the wheel hubs 224. The hub covers 226, 228 may come in a variety of different colors and/or styles. Alternatively, the hub covers 226, 228 can be affixed semi-permanently to the wheel hubs 224. The hub covers 226, 228 may be made from a hard or soft plastic, plastic/rubber composite or compound, metal, or any other suitable material.

The wheels 220, 230 can allow for wheel coverings 232, 234 (e.g., tires) to be fitted over them. The wheel coverings 232, 234 can be removable and be formed of a soft rubber compound. However, the wheel coverings 232, 234 are not limited to soft rubber, and may be made of any compound. The wheel coverings 232, 234 may include any number of tread patterns for specialized or simply stylistic purposes. The wheel coverings 232, 234 can also come in a variety of different styles and/or colors according to a user's preference. In variations, the wheels 220, 230 have the same or substantially the same height as the body 364216, and the wheel coverings 232, 234 can allow for a slight height advantage of the wheel and tire combination with respect to the body. Alternatively, the wheels 232, 234 can be significantly larger in height than the body 216.

The self-propelled device 200 may also include a strut 236 extending from carrier 210 towards the body 216. The strut 236 may have at an end thereof a magnet 238 and a coil 240 may be disposed around the magnet 238, much like the example depicted in FIG. 1. The magnet 238 may be magnetically engaged with a corresponding magnet or magnetic element 242 in an accessory 244. A second coil 246 may be disposed in the accessory 244, much like the coil depicted in the example of FIG. 1. Differential rotation of the wheels 220, 230 causes turning of the self-propelled device 300, however, unlike the spherical self-propelled device of FIG. 1, the axis A about which the housing 216 rotates tends not to tilt. As such, the coils 240, 246 remain generally parallel to axis A during movement of the device 300.

Figure 3A:
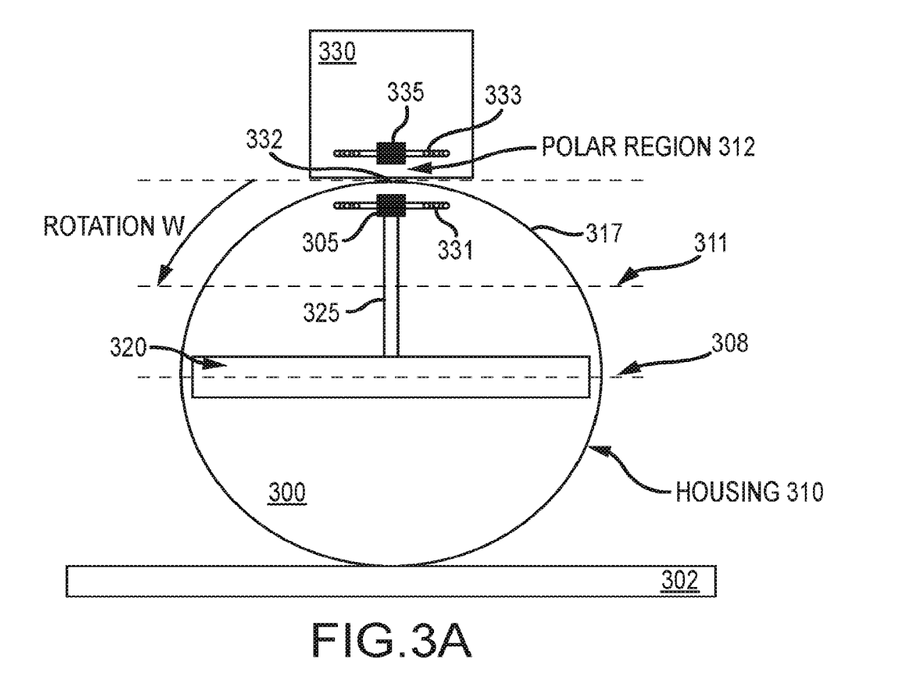
FIGS. 3A-3D depict an example of a spinning or rolling robotic device and accessories.
Figure 3B:
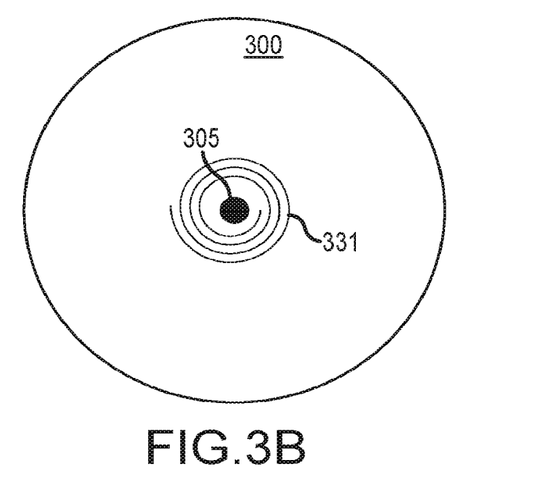
Figure 3C:
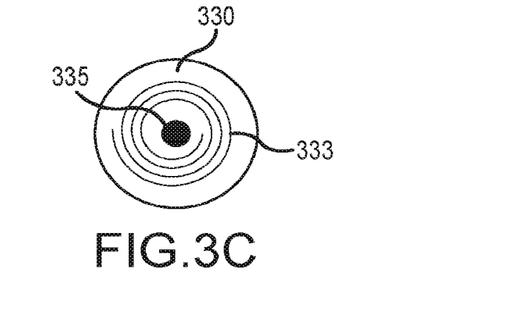
Figure 3D:
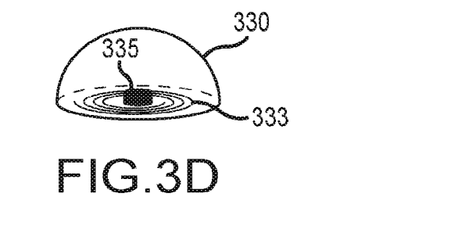

FIGS. 3A-3D illustrate an example of a spinning or rolling self-propelled device 300 that includes components for magnetically coupling with an external accessory device 330, according to some embodiments. A spinning device would include those with a spherical housing, e.g., as depicted in FIG. 1. A rolling device would include those with a cylindrical housing, e.g., as depicted in FIG. 2. The self-propelled device 300 is depicted as being in motion, while magnetically coupled to an external accessory device 330. FIG. 3B illustrates a top view of the self-propelled device 300, depicting a magnetic element 305 for creating a magnetic coupling along with an inductive coil 331. Likewise, FIG. 3C illustrates a top view of the external accessory device 330, depicting a complementary magnetic element 335 for coupling with the magnetic element 305 of the spherical self-propelled device 300. A mating inductive coil is also depicted.

In an example of FIGS. 3A-3D, the self-propelled device 300 is structured in accordance with an implementation such as described with an example of FIG. 1 (e.g., self-propelled device 100), or with an example of FIG. 2 (e.g., cylindrical self-propelled device 200). Accordingly, in an example of FIGS. 3A-3D, self-propelled device 300 includes a spherical housing 410 which rolls on an underlying surface 302 using an internal drive system. In variations, the housing 310 of the self-propelled device 300 can have an alternative rounded shape, such as an elliptical or cylindrical (e.g., with reference to FIG. 2) shape, so that the housing spins above or on the underlying surface 302.

According to one aspect, the self-propelled device 300 can include magnetic element 305 formed from a magnetic material, and an internal support structure 325 to support the magnetic element 305 in a desired orientation and position with respect to the underlying surface 302. By way of example, the support structure 325 can be implemented as part of a biasing mechanism (as described above), and the magnetic element 305 can be provided on a tip or spring end of the biasing mechanism. The magnetic element 305 can correspond to a magnet, or to any material (e.g., ferrous metals etc.) which is able to magnetically interact and couple with complementary magnets provided on the external accessory device 330. A board structure 320 (e.g., printed circuit board) can provide logic and hardware for controlling the drive system of the self-propelled device 300. In one implementation, the board structure 320 and the support structure 325 are provided as part of a platform which maintains a substantially constant angular position with rotation (W) of the housing 310 relative to the underlying surface 302.

The accessory device 330 can include a complementary magnetic element 335 on or near a bottom region which makes contact with the spherical housing 310. In variations, the accessory device 330 can include a variety of shapes and orientations, depending on the implementation or purpose of the combined device. For example, in an implementation of FIGS. 1A-1C, the accessory device 330 includes a cylindrical or rectangular "hat" shape for the spherical housing 310. In other variations, the accessory device 330 can have a sphere or ball shape. In many applications, the self-propelled device 300 operates as a toy or device for amusement, and the accessory device 330 is selectively shaped or structured to imitate human characteristics, or to provide other enhancements for furthering the amusement and appreciation of the combined device.

In one implementation, the magnetic elements 305, 335 of each of the self-propelled device 300 and the accessory device 330 are magnets oriented such that their opposing poles are directed towards each other to enable magnetic attraction. In variations, the magnetic elements 305, 335 of the self-propelled device 300 or the accessory device 330 include magnetically interactive materials, such as ferrous metals.

In various examples, an operational or use environment of the self-propelled device 300 can include events or conditions which disrupt the motion of the self-propelled device 300, such as (i) variations in the underlying surfaces (e.g., transition from smooth flooring to carpet flooring), (ii) collisions (e.g., with walls or other self-propelled devices), and (iii) relatively sharp velocity and acceleration of the self-propelled device 300, due to the self-propelled device 300 spinning or turning in any one of a variety of directions. Given the operational and use environment of the self-propelled device 300, the magnetic elements 305, 335 can maintain a strong, stable, and resilient magnetic coupling between the self-propelled device 300 and the accessory device 330. This magnetic coupling enables continuous communication between coils 331, 333, even during movement of the self-propelled device 300.

Accordingly, in some embodiments, the quantity and/or distribution of magnetic elements (or magnetic material) within the spherical housing 310 can be varied to increase stability and/or resiliency of the magnetic coupling. For example, while an example of FIG. 3A provides for the magnetic element 305 to be positioned substantially in a polar region 312 (relative to the underlying surface 302), in variations, the magnetic element 305 can be replaced or augmented with multiple discrete magnetic elements that are positioned to promote strength, stability, or resiliency in the magnetic coupling. For example, discrete magnetic elements can be positioned equidistantly (or otherwise) from the polar region 312, such as along a latitudinal plane 311 between the equator 308 and the polar region 312. The accessory device 330 can include one or more complementary magnetic elements 335 to enable the desired magnetic coupling.

Still further, a coupling surface of the accessory device 330 can include contours and features to reduce friction, at least when the self-propelled device 300 is in motion. The presence of friction can, for example, cause the spherical housing 310 and accessory device 330 to magnetically detach or destabilize the coupling between the two devices. To reduce friction, a bottom surface 332 of the accessory device 330 can be rounded, and an exterior surface of each of the spherical housing 310 and the accessory device 330 can be maintained relatively smooth. Additionally, one or both of the exterior surface 317 of the spherical housing 310 and the bottom surface 332 of the accessory device 330 can be formed from a material that reduces friction with other surfaces.

The accessory device 330 may exhibit a variety of differing shapes in a variety of different sizes. For example, referring to FIG. 3D, the accessory device 330 may be dome-shaped or hemispherical. The accessory device 330 may further be shaped as a disc, a cuboid, a cylinder, or any number of other irregular shapes. Regardless of the shape or size, the accessory device 330 can include a number of magnets 335 to remain under magnetic interaction with the magnetic element 305 of the self-propelled device 300, along with an inductive coil 333 fixed relative to the accessory 330 and magnet 335. Furthermore, the accessory device 330 may be interchangeable with various other accessory devices of differing shapes and sizes.

Figure 4:
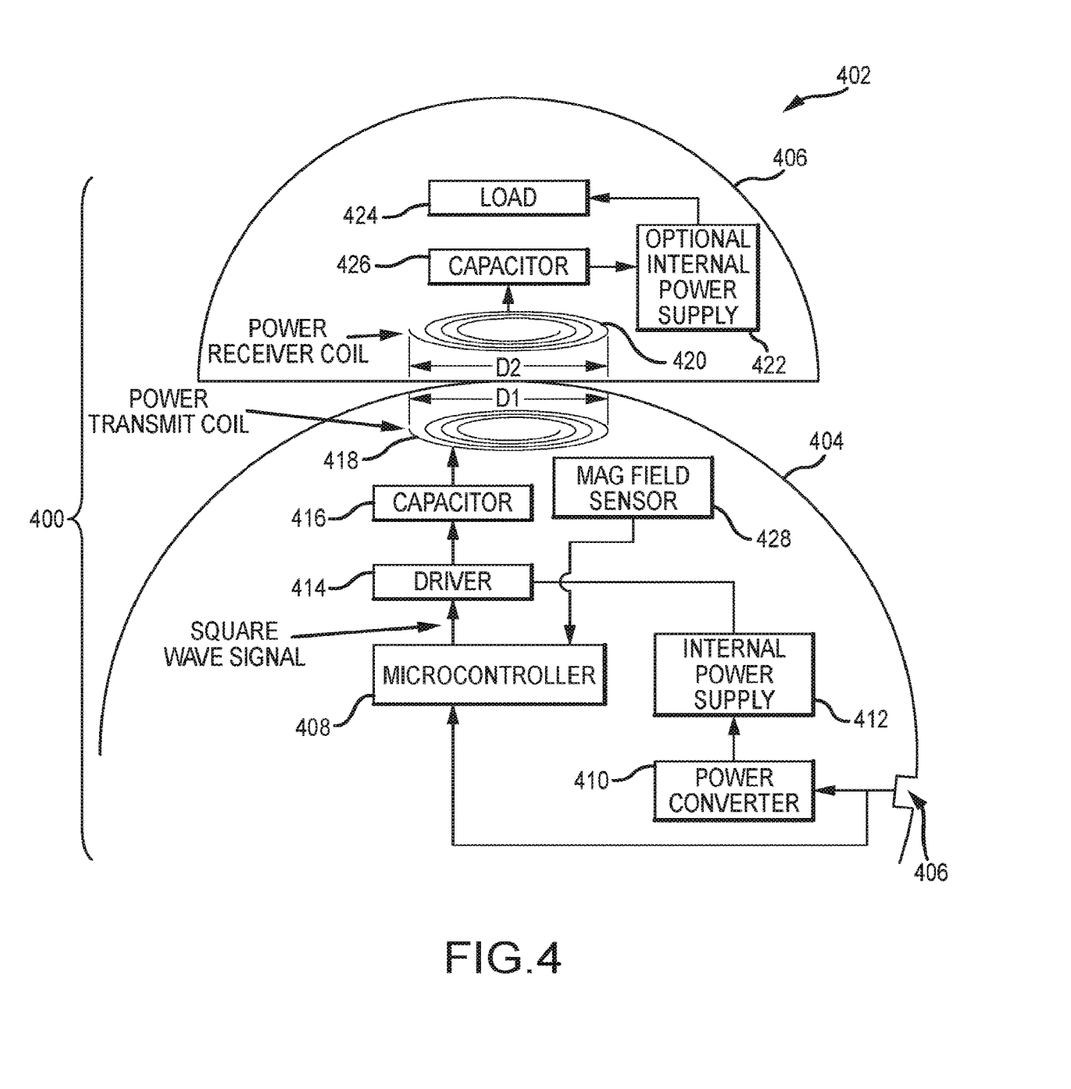
FIG. 4 depicts a schematic electrical system for a spinning or rolling robotic device.

FIG. 4 depicts a schematic electrical system 500 for a spinning or a rolling robotic device 402. Such robotic devices may be the spherical or cylindrical devices as depicted herein. The robotic device 402 includes a first body portion 404 and a second body portion 406, e.g., in the form of an accessory magnetically engaged via one or more magnets (not shown) with the first body portion 404. The first body portion 404 may include an external port 406 that may be connectable to a power source, such as a building power or other source. In another example, the port 406 may be a data and power transfer port (e.g., a USB, mini USB, micro USB, etc.) for transferring both data and power signals from a connected computer or dedicated device. Thus, the robotic device can receive system and software updates, as well as power, via the port 406. Data signals may be sent to a microcontroller 408. A power converter 410 is used to convert external power from AC to DC power that may be stored by an internal power source 412, such as one or more batteries. A coil driver 414, such as a pulse width modulation driver, sends a signal to a capacitor 416, then to an associated first coil 418, which transfers data or power to an associated second coil 420 and capacitor 426 in the second body 406. Each capacitor 416, 426 forms a resonant link with its associated coil 418, 420, which drives the transmit coil (e.g., first coil 418) with a low voltage square wave and allows the frequency of operation to be tuned to a specific band of frequencies. Further, this allows the reactive part of the impedance of the load 424 to be tuned for maximum power transfer and optimal efficiency. In another example, the capacitor 416 may be integrated with the driver 414 and capacitor 426 may be integrated with the in the internal power supply 422. The microcontroller 408 contains charging intelligence and controls the data and power transfer sent from the first coil 418.

In this example, power is transferred wirelessly from the first coil 418 to the second coil 420. In general, both data and power signals may be sent from the first body coil 418 to the second body coil 420. In examples, return signals (e.g., in the form of data, status, or other signals) may be sent to the first body coil 418 from the second body coil 420. Such return signals may be utilized to communicate a condition of the accessory 406 or related elements to the microcontroller 408. These may include charge level of the internal power supply 422, status (ON, OFF, ERROR) of a load 424, etc. A magnetic field sensor 428 is utilized to detect the magnetic field generated by magnet(s) in either or both of the first body 404 and the second body 406. Thus, if proximity between the first body 404 and the second body 406 is lost (due to a loss or change in the magnetic field), the microcontroller 408 may stop data or power transfer operations. Further, one or more protection elements may be utilized at either or both of the internal power supplies 412, 422. These may include one or more of over-voltage, over-current, and over-temperature protection devices for protection of the batteries 412, 422.

The internal power supplies 412, 422 may connect to rechargeable batteries such as lithium-ion batteries. Additionally, each of the internal power supplies 412, 422 may include one or more discrete batteries, although it may be advantageous to use a single battery for the internal power supply 422 disposed in the second body 406, to limit the weight thereof. The load 424 may include devices such as LEDs, audio speakers, or other elements that may be directly powered by the signal received by the second coil 420 or by the connected internal power supply 422. Additionally, for robotic devices that also transfer data signals via the coils 418, 420, a microcontroller that directly controls such loads (e.g., control of emission patterns or colors, speaker volume, etc.), may also be incorporated into the second body 406.

The coils 418, 420 each have diameters D1, D2, respectively, which may be the same or different. In an example, the second coil 420 may have a diameter D2 greater than the diameter D1 of the first coil 418. During movement of the robotic device 402, the magnets holding the second body 406 proximate the first body 404 may become misaligned, although the magnetic retention may not fail. Under such conditions, it may be advantageous that one coil 418, 420 be larger than the other, such that signal transmission may be maintained, even when center points of the coils 418, 420 are misaligned. Additionally, one of the coils 418, 420 may include a greater number of turns than the other of the coils 418, 420. This may further enable transmission of signals when the center points of the coils 418, 420 are misaligned.

The wireless transmission systems depicted herein may be used in other applications to transmit data or power signals across moving boundaries. As such, the wireless transmission systems may be utilized in any devices or systems having elements that move relative to each other, but where it may be impractical or impossible to span a separation with wires.

Figure 5:
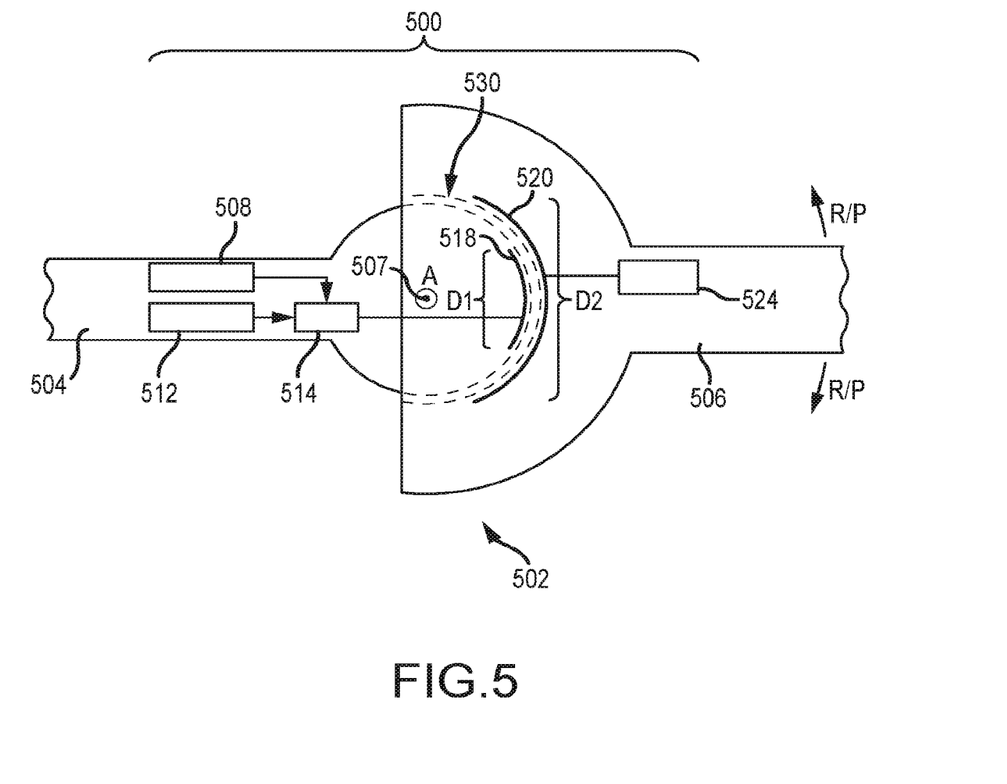
FIG. 5 depicts a schematic electrical system for a pivoting element.

FIG. 5 depicts a schematic electrical system 500 for a pivoting or rotating element 502. The pivoting element may have many applications, for example, as a first arm portion 504 and a second arm portion 506 of an articulating or pivoting robotic arm or other apparatus or system. The first arm portion 504 and second arm portion 506 are joined at a pivot 507 having an axis A extending orthogonal to the page. As such, the second arm portion 506 may rotate R or pivot P about the axis A, relative to the first arm portion 504. In this example, the first arm portion 504 may include certain of the components depicted and described with regard to the first body portion 504 of FIG. 4. However, in the example of FIG. 5, only a microcontroller 508, an internal power supply 512, a driver 514, and a first coil 518 are depicted for clarity. Similarly, the second body portion 506 may include any or all of the components depicted in the second body portion 506 of FIG. 4, although only a second coil 520 and load 524 are depicted in FIG. 5 for clarity. As such, like the robotic devices depicted above, the pivoting element 502 may send electrical signals, in the form of data and/or power signals, wirelessly across an interface 530, even while the first arm portion 504 is moving relative to the second arm portion 506. As in the examples above, the axis A about which rotation occurs does not pass through either coil 518, 520.

The first coil 518 and the second coil 520 are of different diameters D1, D2, respectively, with the second coil 520 having a diameter D2 larger than that of the first coil 518. Since both coils 518, 520 are fixed within their respective arm portions 504, 506, they are not able to maintain center-to-center alignment sufficient for communication therebetween during an entire range of motion. In this example, the larger second coil 520 allows for communication with the first coil 518 even during rotation R or pivoting P of the second arm portion 506 relative to the first arm portion 504.

Figure 6:
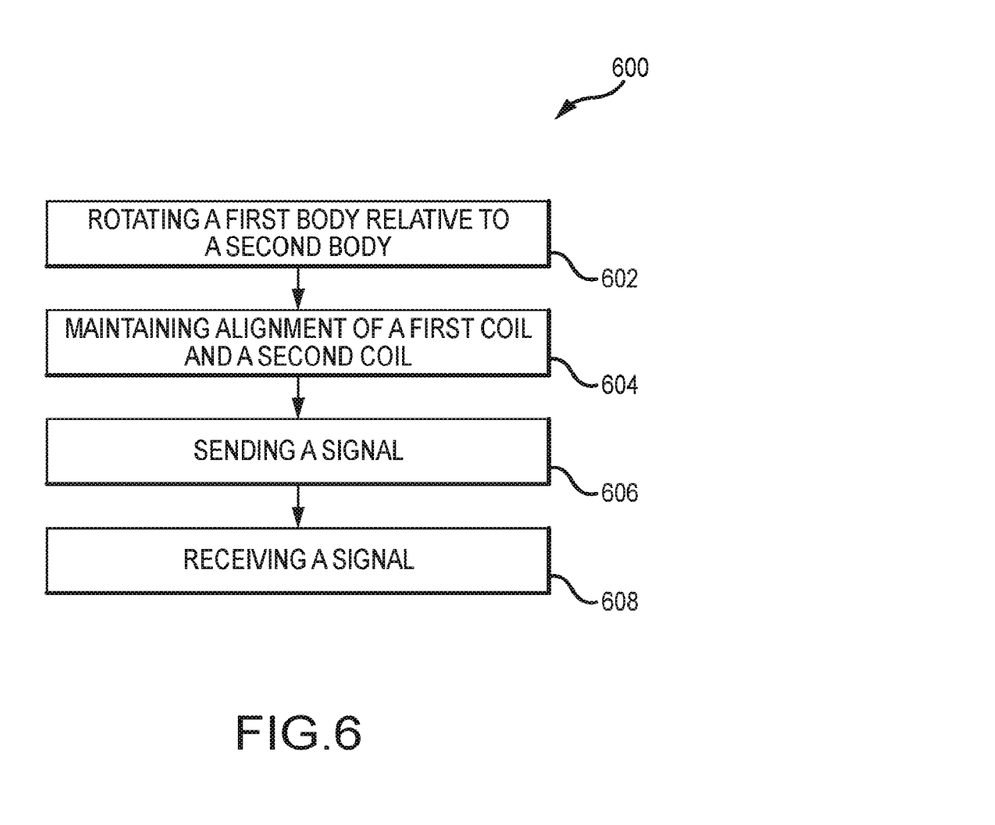
FIG. 6 depicts a method of inductively coupling portions of a robotic device.

FIG. 6 depicts a method 600 of inductively coupling portions of a robotic device so as to send data and/or power signals therebetween. The method 600 is described in the context of a robotic device having first and second bodies, for example, such as the robotic devices (spherical or cylindrical) and pivoting systems described above. The method 600 begins at operation 602, where the first rotating body is rotated relative to the second body. During rotation, alignment of a first coil disposed in the first body and a second coil disposed in the second body is maintained in operation 604. In this case, alignment is sufficiently maintained if signals may be sent and received between the two coils. That is, center-to-center misalignment of the coils is acceptable, provided signals may still be sent and received between the two coils. The sending and receiving of signals are recited in operations 606 and 608, respectively. In an example, both the sending operation 606 and the receiving operation 608 may be performed by the same one of the two coils. In another example, the sending operation 606 may be performed by one of the coils, while the receiving operation 608 is performed by the other of the coils.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

The invention claimed is:

1. A method of inductively coupling a first body and a second body, wherein the first body is rotatable relative to the second body, the method comprising:
rotating the first body relative to the second body; and
while rotating the first body, maintaining alignment of a first coil disposed in the first body to a second coil disposed in the second body; and
at least one of:
(a) sending a signal from the first coil to the second coil and (b) receiving a signal from the second coil at the first coil.

2. The method of claim 1, wherein the second coil is fixed relative to an outer surface of the second body.

3. The method of claim 1, wherein the first coil is movable relative to an outer surface of the first body.

4. The method of claim 1, wherein the first body comprises a substantially spherical outer surface.

5. The method of claim 1, wherein the first body is configured to be rotated about an axis substantially parallel to the first coil.

6. An apparatus comprising:
a body comprising a body housing comprising an outer surface and an inner surface at least partially defining an interior body volume;
a drive element rotatably engaged with the inner surface;
a biasing mechanism for biasing the drive element into contact with the inner surface, wherein the biasing mechanism comprises a bearing disposed opposite the drive element; and
a body coil disposed in the interior body volume and about the biasing mechanism.

7. The apparatus of claim 6, further comprising an accessory comprising:
an accessory housing defining an interior accessory volume;
an accessory coil disposed in the interior accessory volume; and
a retaining element disposed proximate the accessory coil.

8. The apparatus of claim 7, wherein at least one of the bearing and the retaining element comprises a magnet.

9. The apparatus of claim 7, wherein the retaining element is configured to magnetically couple with the bearing.

10. The apparatus of claim 9, wherein when the retaining element is magnetically coupled with the bearing, a center point of the body coil is aligned with a center point of the accessory coil.

11. The apparatus of claim 7, wherein the accessory coil and the retaining element are fixed relative to the accessory casing.

12. The apparatus of claim 7, wherein the accessory coil is disposed about the retaining element.

13. An apparatus comprising:
a first body comprising a first body housing, wherein the first body housing is configured to rotate about an axis;
a first coil disposed in the first body housing, wherein the first body housing is configured to rotate relative to the first coil;
a second body disposed proximate the first body, the second body comprising a second body housing;
a second coil disposed in the second body housing, wherein the second coil is configured to be aligned with the first coil during a rotation of the first body housing.

14. The apparatus of claim 13, wherein the first coil is disposed substantially parallel to the axis.

15. The apparatus of claim 13, wherein the first body housing is substantially cylindrical.

16. The apparatus of claim 13, wherein the first body housing is substantially spherical.

17. The apparatus of claim 13, wherein the first coil comprises an outer diameter smaller than an outer diameter of the second coil.

18. The apparatus of claim 13, further comprising a first magnet disposed in the first body and a second magnet disposed in the second body housing, wherein the first magnet and second magnet magnetically engage to retain the first body in proximity to the second body.

19. The apparatus of claim 18, wherein the first coil is disposed about the first magnet.

20. The apparatus of claim 18, wherein the first magnet bears against an inner surface of the first body casing.

* * * * *